United States Patent [19]
Yamaguchi

[11] Patent Number: 5,115,906
[45] Date of Patent: May 26, 1992

[54] CONVEYOR ELEVATOR SYSTEM

[75] Inventor: Tameaki Yamaguchi, Toyonaka, Japan

[73] Assignee: Tsubakimoto Bulk Systems Corporation, Osaka, Japan

[21] Appl. No.: 736,257

[22] Filed: Jul. 26, 1991

[30] Foreign Application Priority Data

Jul. 26, 1990 [JP] Japan ............... 2-78692
Aug. 23, 1990 [JP] Japan ............... 2-87427
Aug. 23, 1990 [JP] Japan ............... 2-87428

[51] Int. Cl.⁵ ......................... B65G 19/14
[52] U.S. Cl. ................... 198/716; 198/494; 198/860.3
[58] Field of Search ......... 198/494, 720, 580; 198/860.3, 716

[56] References Cited

U.S. PATENT DOCUMENTS

| | | | |
|---|---|---|---|
| 2,157,301 | 5/1939 | Neuman | 198/494 |
| 3,595,379 | 7/1971 | Campbell | 198/860.3 X |
| 3,809,211 | 5/1974 | Padilla | 198/580 X |
| 4,230,222 | 10/1980 | Clark | 198/580 |
| 4,685,361 | 8/1987 | Myers | 198/860.3 X |
| 4,944,384 | 7/1990 | Herron | 198/494 |

Primary Examiner—Robert P. Olszewski
Assistant Examiner—Cheryl L. Gastineau
Attorney, Agent, or Firm—Flynn, Thiel, Boutell & Tanis

[57] ABSTRACT

A conveyor elevator system having an endless conveyor belt in which guide rollers are provided to contact and guide the side edges of the belt to prevent lateral shifting thereof. A discharge plate is provided at the lower end of the vertically upwardly moving reach of the conveyor belt for receiving particulate material that escapes from the upwardly moving reach of the belt and falls downwardly. The discharge plates guide the escaped material into the carrier plate passage so that the escaped material is recycled. The skirt plates that define the sides of the carrier plate passage having seal elements that cooperate with projecting elements on the conveyor belt to form a labyrinth passage to reduce the amount of material that escapes.

1 Claim, 8 Drawing Sheets

CONVEYOR ELEVATOR SYSTEM

BACKGROUND OF THE INVENTION

1. Field of the Invention

This invention relates to a belt conveyor and elevator system for lifting free-flowing, scatterable materials, such as granular materials, to an elevated location.

2. Description of the Prior Art

In a conventional belt conveyor and elevator system for lifting free-flowing materials, when such free-flowing materials, for example, granular, bulk solids, fall through a clearance that exists between the conveyor belt and a skirt during lifting and are accumulated on the back surface of the return-side portion of the conveyor belt, when the return-side portion of the belt is passed over the pulleys, the accumulated free-flowing material is pressed between the pulley and the belt and impedes the smooth travel of the belt. To prevent such accumulation, a partitioning plate has been provided between the carrier side and return-side portions of the conveyor belt.

Figure 6:
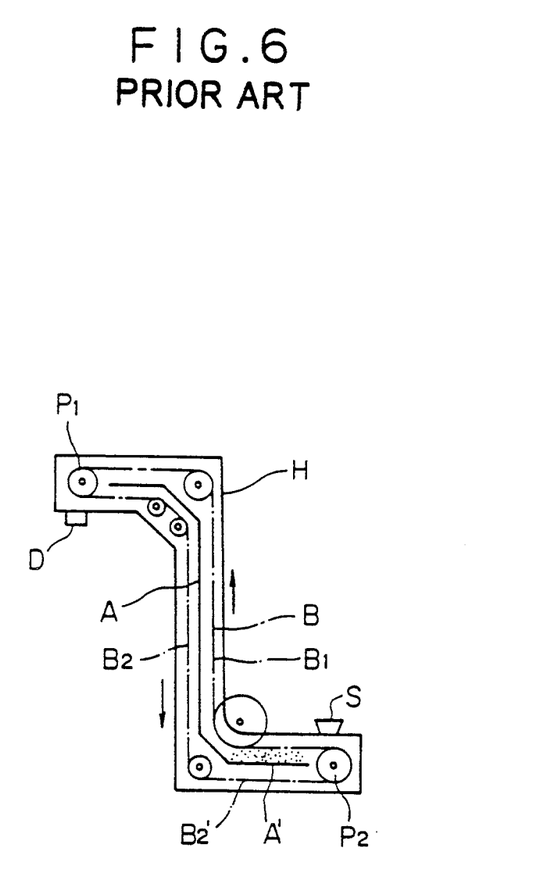
FIGS. 6, 7 and 8 illustrate prior art structures.

For example, as shown in FIG. 6 in the prior art, a discharge opening D and a charging opening S open through an upper portion and a lower portion, respectively, of the casing H of a Z-type conveyor elevator having a rectangular cross-section. An endless conveyor belt B having a number of laterally extending carrier plates thereon extends around a drive pulley $P_1$ and a driven pulley $P_2$. A partitioning plate A is provided in the space between the upwardly moving side $B_1$ and the downwardly moving side $B_2$ of the conveyor belt B.

Accordingly, the free-flowing material that leaks and falls from the periphery of the carrier plates of the belt portion $B_1$ during lifting of the free-flowing material, accumulates on the partitioning plate portion A′ which is located below the horizontal section of belt portion $B_1$ so as not to fall on the back surface of the horizontal section $B_2'$ of the belt portion $B_2$.

The aforementioned prior art has the defect that the free-flowing, particulate material that accumulates on the partitioning plate portion A′ has to be recovered frequently by scraping the partitioning plate portion A′ by hand.

Figure 7:
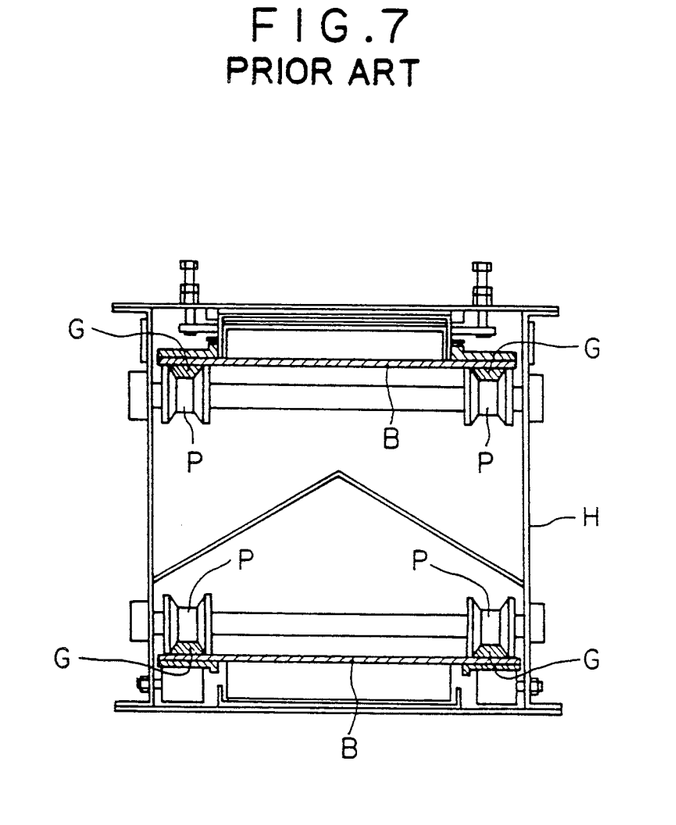

In a conventional belt conveyor and elevator system for lifting free-flowing particulate materials, a technique is disclosed, for example, in Japanese Utility Model Laid-Open No. 140323/1989, in which, as shown in FIG. 7, trapezoidal projections G having converging inclined surfaces project from the lower surface of the conveyor belt B adjacent to the opposite side edges thereof. The trapezoidal projections G fit into trapezoidal grooves of guide pulleys P which are fixedly mounted on a plurality of rotatable shafts mounted on and extending between opposite side plates of the casing H thereby to prevent lateral drifting or shifting movement of the belt B.

The aforementioned prior art has drawbacks in that the lateral drifting movement of the belt cannot be prevented unless the centers of the trapezoidal grooves of a number of the guide pulleys P are aligned in a straight line in the direction of the travel of the belt. The trapezoidal projections G cannot easily be mounted on the lower surface of the belt B at accurate fixed distances from both side edges of the belt and without being curved. When the belt B travels in a lateral drifting manner, the seal lip of the belt touches the seal recess of a skirt plate and becomes worn, thereby causing lowering of the seal performance.

Figure 8:
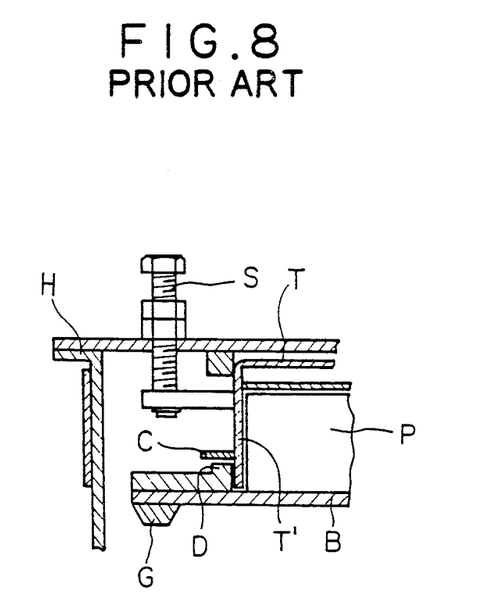

A conventional anti-leaking device for free-flowing particulate material, in a belt conveyor and elevator system for lifting the free-flowing particulate material, as shown in FIG. 8, is disclosed in the aforementioned Japanese Utility Model Laid-Open No. 140323/1989.

FIG. 8 is a sectional view of the essential parts of a belt conveyor system in which an endless conveyor belt B is disposed within a closed-type casing H having a square cross-section. Mounted on the inner surface of an upper plate of the casing H is a trough T having a channel-shaped cross-section which trough forms a carrier passage for a number of lateral carrier plates P which are provided at equal intervals along the carrier surface of the conveyor belt B. The free end of the skirt plate T′ of the trough T is positioned close to and slightly spaced from the side edges of the carrier surface on both sides of the belt B.

Anti-outflow, upright members D, adapted for hindering outflow of the free-flowing material and having an L-shaped cross-section, are mounted on the carrier surface close to both side edges of the belt B, in a slightly spaced relation to the outer surface of the skirt plate T′ of the trough T. The top of the upright member D is slightly spaced from and is overlapped by a cover plate C which projects from the outer surface of the skirt plate T′.

Projections G projecting from the lower surfaces on both side edges of the belt B form trapezoidal guide rails which are fitted and guided in corresponding recesses of pulleys provided with grooves for carrying and guiding the belt B, as shown in FIG. 7.

In the aforementioned prior art, the clearance formed by the anti-outflow member D and the outer surface of the trough skirt plate T′ is linear. Therefore, when the clearance between the top of the anti-outflow member D and the cover plate C increases, the free-flowing material that flows out between the free end of the skirt plate T′ and the carrier surface of the belt easily overflows from the linear clearance through the top of the anti-outflow member D so that the free-flowing material is apt to leak outside the member D. This results in the difficulty that the height of the cover plate C needs to be vertically adjusted by means of a bolt S together with the skirt plate T′ to minimize the clearance between the top of the anti-outflow member D and the cover plate C, but only to such an extent that they do not contact each other.

SUMMARY OF THE INVENTION

In one embodiment of the present invention, the partitioning plate in the prior art is eliminated. The discharge plate for discharging the free-flowing particulate material that falls toward the return-side portion of the conveyor belt, outwardly of the conveyor belt over both side edges of the return-side portion of the conveyor belt is arranged at a lower position below the lifting portion of the conveyor belt. The free-flowing material that escapes during lifting falls onto the discharge plate. A recovery guide plate guides the free-flowing material that flows down from the discharge plate into a carrier plate passage which is provided at a corner of the closed-type casing.

The free-flowing material that escapes from the carrier side conveyor belt during lifting falls down onto the discharge plate before it reaches the back surface of the return-side portion of the conveyor belt, which is located below the lifting portion of the conveyor belt. The free-flowing material is then guided and discharged outwardly of both side edges of the return-side portion of the conveyor belt so as to accumulate on the bottom plate of the casing. The free-flowing material that is guided and discharged onto the bottom plate of the casing is carried by the carrier plates of the return-side portion of the conveyor belt and reaches the carrier-side portion of the conveyor and are again lifted together with the fresh free-flowing material supplied through the charging opening.

According to the present invention, the lateral drifting or shifting movement of the belt is prevented by cylindrical guide rollers which contact both side edges of the conveyor belt. The lateral drifting or shifting movement of the belt can be prevented by the guide rollers in contact with both edges of the belt.

According to the present invention, a seal element protrudes from the outer surface of the skirt plate and provides a seal recess. The seal recess is placed over an anti-outflow upright member mounted on the belt thereby to form a gate-like clearance between the seal recess and the anti-outflow upright member whereby the passage for leaking free-flowing material is inverted and bent to increase the outflow resistance.

The free-flowing material that flows out of the clearance between the free end of the trough skirt and the carrier surface of the belt flows into the gate-like clearance formed by the seal recess and the anti-outflow upright member. However, since the gate-like clearance forms an inverted bent passage which provides a labyrinth effect having a large flow resistance, the free-flowing material does not easily flow outside the anti-outflow upright member even if the clearance between the seal recess and the anti-outflow upright member is not adjusted to the minimum, and leakage from the gate-like clearance can be considerably reduced.

DETAILED DESCRIPTION

Figure 1:
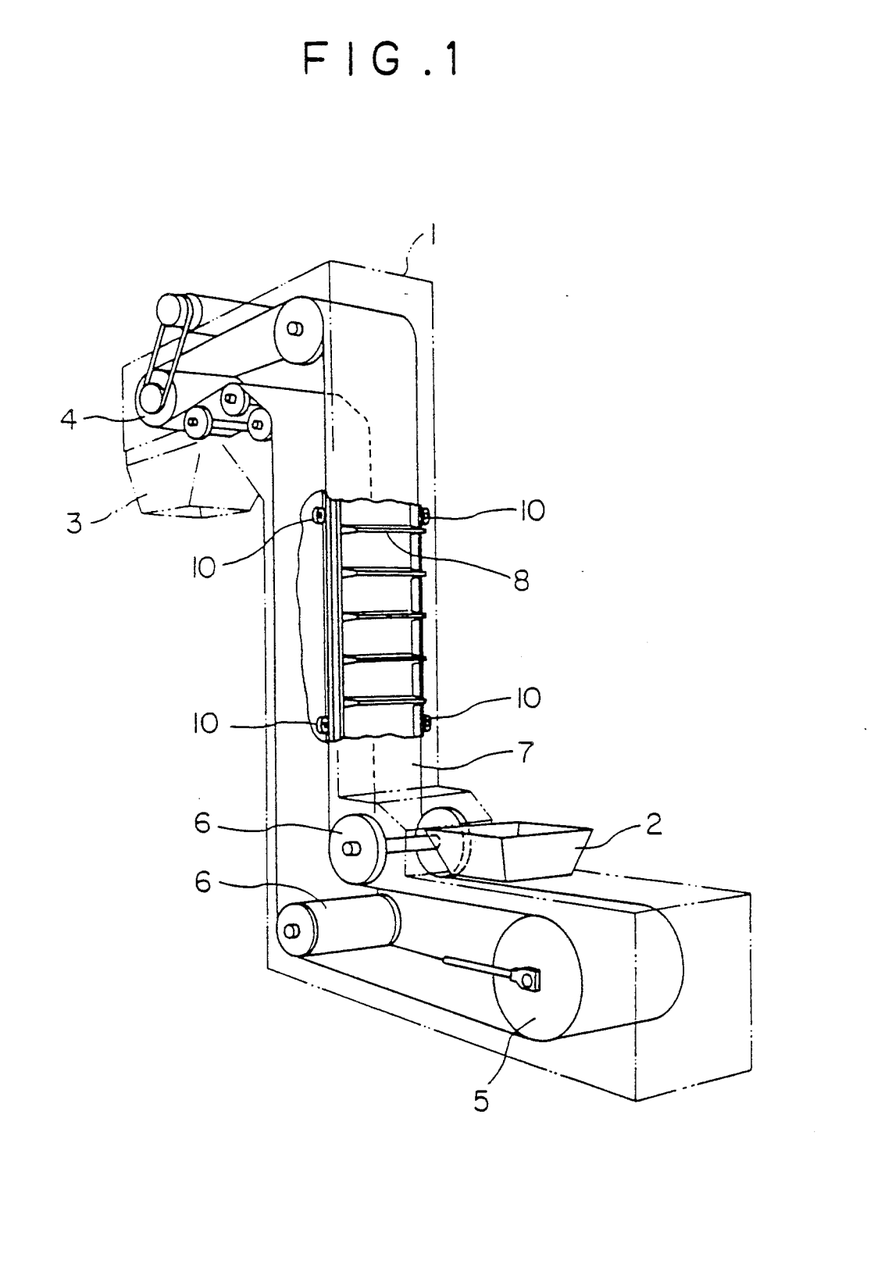
FIG. 1 is a perspective view of a continuous flow, Z-type conveyor elevator, according to the invention.

FIG. 1 is a perspective view of a continuous flow, Z-type, conveyor elevator system for lifting fine, free-flowing, particulate material, according to the present invention. The conveyor elevator system comprises a closed casing 1 which is of a substantially Z shape in front view. A charging opening or chute 2 and a discharge opening or chute 3 are provided in a lower horizontal carrier portion and an upper horizontal carrier portion, respectively, of the casing 1. A drive pulley 4 and a driven pulley 5 are mounted in the casing 1 at the end of the discharge opening side and at the end of the charging opening side, respectively. A number of laterally projecting carrier plates 8 are provided on the carrier surface of an endless conveyor belt 7. The belt 7 is lifted and guided by intermediate pulleys 6 and extends around both the pulleys 4 and 5. The carrier plates 8 cause the free-flowing, powdered material that is charged through the charging opening 2 to be lifted in a vertical path and then be discharged through the discharge opening 3. During lifting, some of the free-flowing material which is moved upwardly by the carrier plates 8 sometimes falls from the clearance space between the conveyor belt and the skirt. An inverted V-shaped downwardly diverging, discharge plate 18 extends over and beyond both side edges of the return-side portion of the conveyor belt 7, that is, the lower reach thereof, to prevent the downwardly falling, free-flowing material from accumulating on the reverse side of the lower reach of the conveyor belt 7. The discharge plate 18 is positioned below the lower end of the lifting portion or upwardly moving reach of the conveyor belt 1, that is, below the intermediate pulley 6. An inclined, flat guide plate 19 extends upwardly from the discharge plate 18 substantially to the inner surface of the downwardly moving reach of the belt 7, for guiding the free-flowing particulate material to the discharge plate 18.

Figure 2:
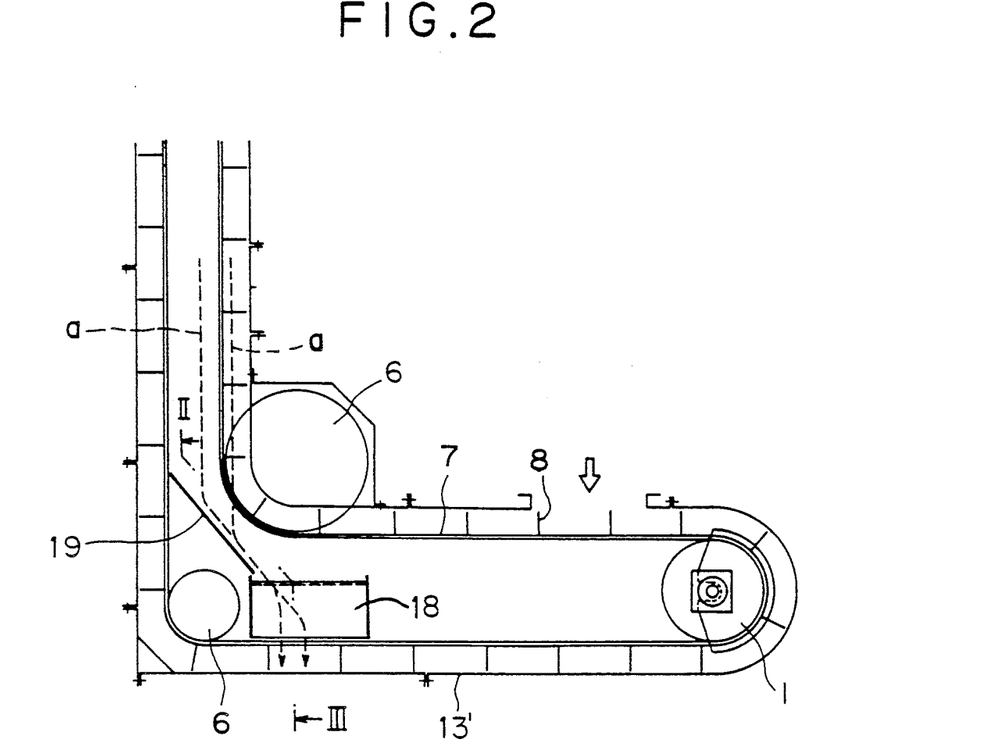
FIG. 2 is a schematic view of the lower portion of the conveyor elevator of FIG. 1 and illustrating means for guiding the free-flowing material that falls onto the lower end of the conveyor elevator.
Figure 3:
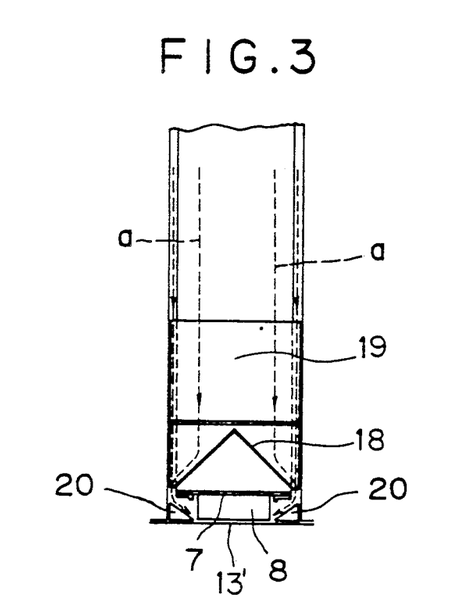
FIG. 3 is a view substantially as taken along the line III—III of FIG. 2.

Accordingly, the free-flowing material that falls downwardly in the direction as indicated by the dotted line a is distributed to the left and right by the inverted V-shaped discharge plate 18 and falls onto the bottom plate 13' of the casing 1 below the return-side portion of the conveyor belt 7, as shown in FIG. 2.

Recovery guide plates 20 and 20 are provided at the corners of the casing 1 adjacent to the bottom plate 13' to guide the free-flowing material to the central portion of the carrier plate passage of the return-side portion of the conveyor belt. Therefore, the free-flowing material is recovered by the carrier plates 8, pass around the driven pulley 5 and again is lifted together with the freshly supplied free-flowing material that is charged through the charging opening 2.

Figure 4:
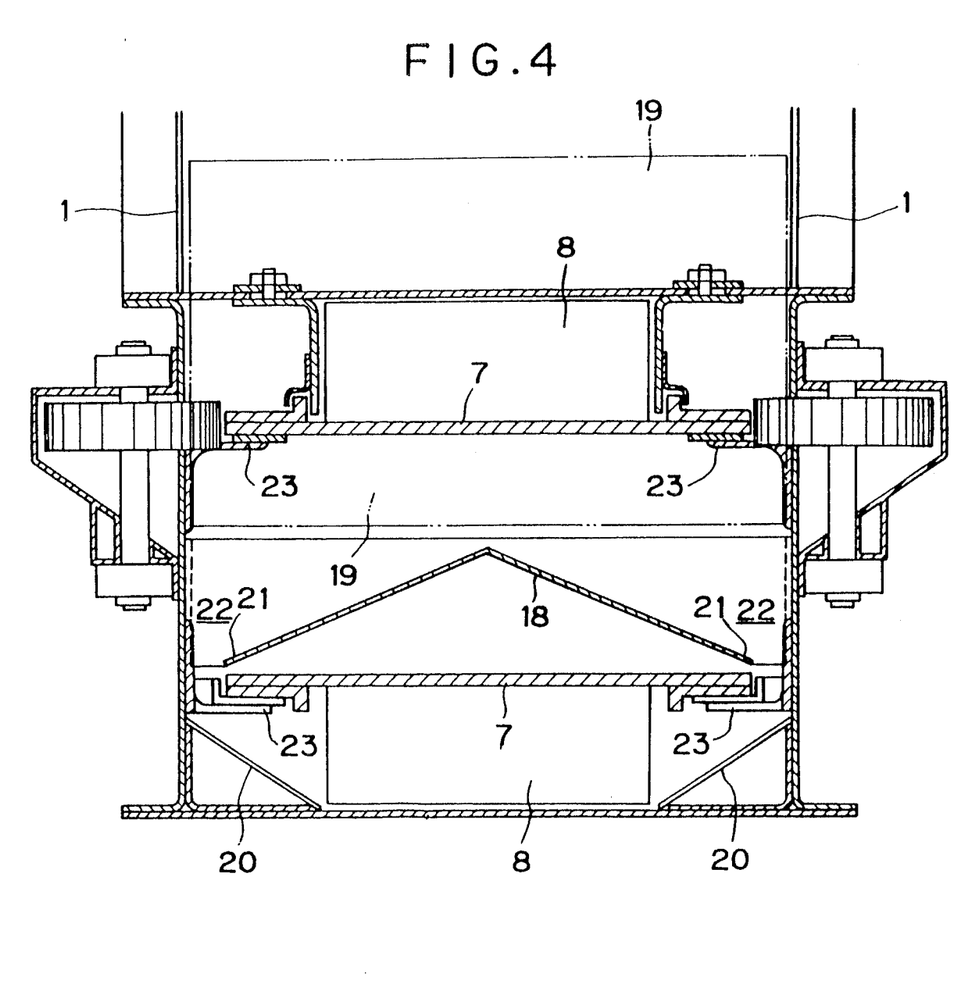
FIG. 4 is a vertical sectional view through the lower reach of the conveyor elevator substantially as taken along the line III—III of FIG. 2.

Referring to FIG. 4, the lower edges 21 and 21 on both sides of the angle-shaped, downwardly diverging, flow-down discharge plate 18 are spaced from both side plates of the casing 1 to form discharge clearances. The front and rear ends of the lower edges 21 and 21 are mounted on the side plates of the casing 1 through mounting elements 22 and 22. Guide rails 23 and 23 for supporting the belt 7 are cut for the entire length of the discharge plate 18 so that the free-flowing material that flows down on the discharge plate 18 can fall onto the recovery guide plates 20 and 20. This will not adversely affect the running function of the conveyor belt 7 since the length of the discharge plate 18 is relatively short.

In the present invention, the free-flowing material that escapes from the carrier plates 8 and falls through the casing 1 during the lifting accumulate in the central portion of the carrier plate passage of the return-side portion of the conveyor belt from outside of both side edges of the belt, without accumulating on the back surface of the return-side portion of the conveyor belt, because of the flow-down discharge plate 18. Therefore, the thus-accumulated materials are recovered by the carrier plates 8 and are again lifted and discharged from the discharge opening 3.

Accordingly, the problem involved in removing the free-flowing material, that escaped from the carrier plates 8, outside the casing by manual operation is eliminated and, in addition, those materials do not accumulate on the back surface of the return-side portion of the conveyor belt. Therefore, such free-flowing material will not be pressed between the pulleys to impede the smooth travel of the conveyor belt. Furthermore, there is the excellent effect that the escaped material is automatically continuously recovered and again recycled for discharge from the discharge opening 3.

Figure 5:
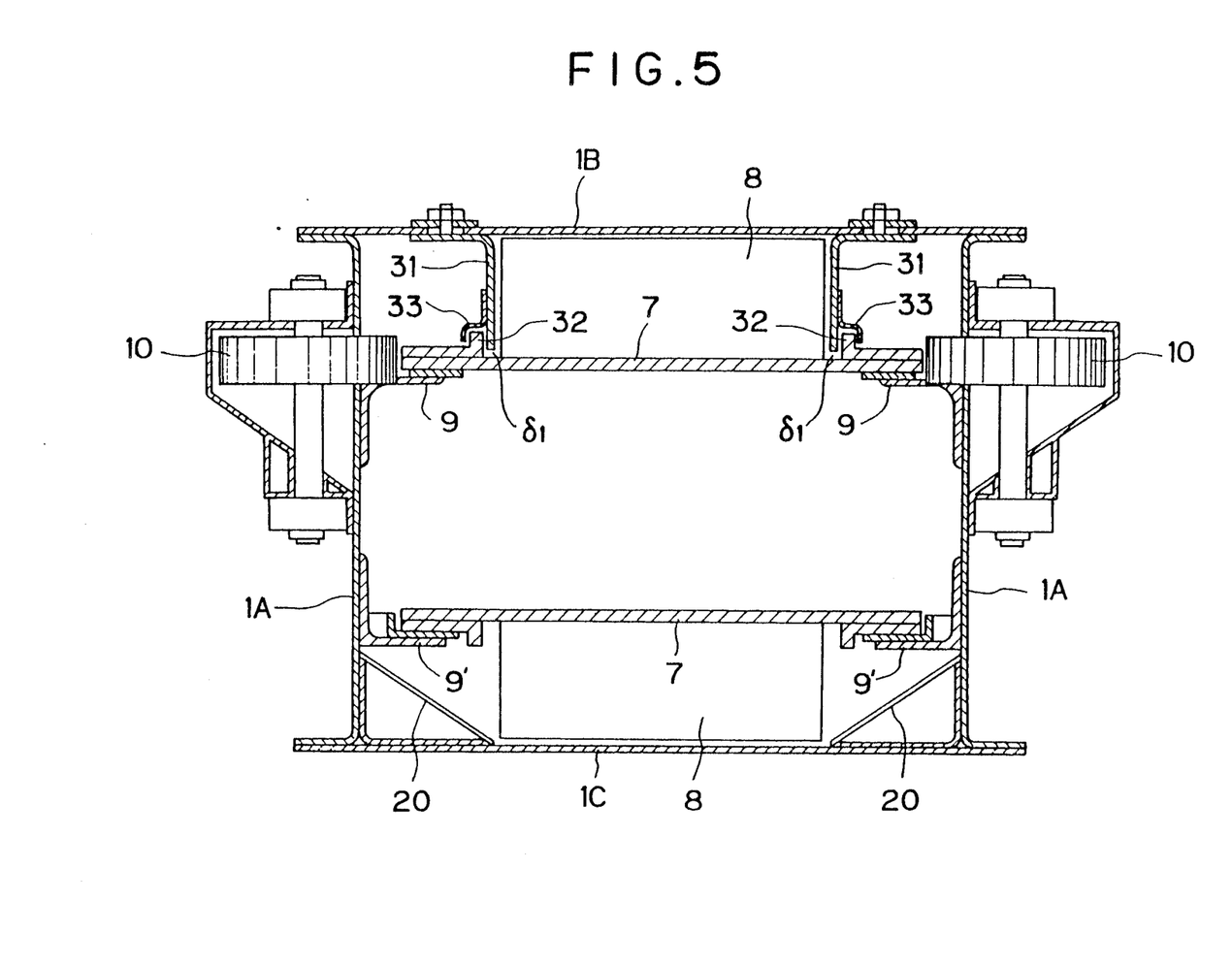
FIG. 5 is a vertical section view, like FIG. 4, but taken at a different position along the lower reach of the conveyor elevator.

FIG. 5 is a sectional view of the casing 1 in one of the two horizontal carrier portions of the Z-shaped conveyor elevator system. Two pairs of supporting rails 9, 9 and 9', 9' provide flat surfaces for supporting the lower surfaces of opposite edge portions of the belt 7. The rails 9, 9 and 9', 9' are mounted on and project inwardly from the inner surfaces of the opposite side plates 1A, 1A of the closed casing 1. A number of notches 9a (FIG. 5a) are provided at suitable intervals along the supporting rails 9, 9, and cylindrical rotatable guide rollers 10 extend into the notches and are adapted to contact the side edges of the belt 7 to prevent the lateral meandering of the belt 7.

A pair of skirt plates 31, 31 define the sides of a passage for the carrier plates 8 on the conveyor belt 7. The skirt plates 31, 31 are mounted on the upper plate 1B of the casing 1 for lateral adjustment so that the spacing between the skirt plates can be narrowed or widened in a lateral direction. Flanged seal elements 33, 33 form passages for receiving the seal lips 32 which extend upwardly from the carrier surface of the belt 7. The seal elements 33, 33 are mounted on the free (inner) ends of the skirt plates 31 and 31.

At the free ends of the skirt plates 31 and 31, a clearance $\delta_1$ is formed with respect to the carrier surface of the belt 7, and therefore, some of the free-flowing material loaded on the belt 7 is capable of flowing out of the clearance $\delta_1$ during horizontal transporting. However, the anti-outflow upright members 32, 32 are mounted on both side edge portions of the carrier surface of the belt 7 to dam the material that leaks out of the clearance $\delta_1$.

The members 32 and 32 project into seal recesses provided by the seal elements 33, 33, and a gate-like clearance $\delta_1$ is formed between the members 32, 32 and the seal elements 33, 33.

Accordingly, the outwardly flowing, material is first dammed by the anti-outflow members 32 and 32 and some of it flows into the gate-like clearance $\delta_1$. Since the gate-like clearance $\delta_1$ forms a reversely bent or labyrinthine flow passage, the outflow resistance is higher so that the material that flows into the gate-like clearance $\delta_1$ tends to be easily retained within the gate-like clearance $\delta_1$, thus preventing the material from leaking out of the gate-like clearance $\delta_1$.

Explanation of the structure of the vertical portion of the casing 1 will be omitted because the supporting rails for the carrier-side belt and guide rollers are provided, similarly to the aforementioned horizontal carrier portion, except that the flow-down guide plates 20, 20 and the supporting rails 9', 9' on the return-side belt are not provided.

Figure 5A:
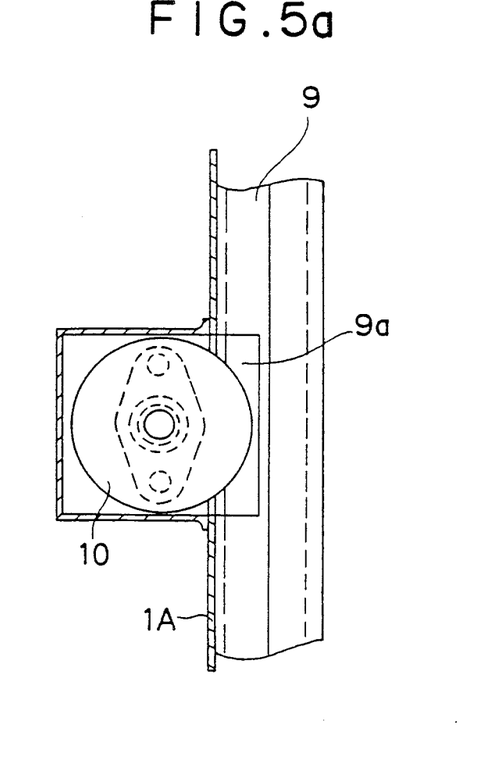
FIG. 5a is a plan view of the guide rail and guide roller.

According to the present invention, the lateral shifting of the belt 7 is prevented by the cylindrical guide rollers 10 which contact the edges on both sides of the belt 7 and the belt is supported by flat-plate supporting rails 9, 9 and 9', 9'. Therefore, it is not necessary to provide projections to prevent the lateral drifting of the belt and it is not necessary to provide a high precision mounting of a number of V-grooved pulleys fitted into the projections to be aligned on a straight line.

According to the present invention, the material on the belt that flows out of the clearance between the free end of the skirt plate and the carrier surface of the belt is dammed by the anti-outflow members, and the members are inserted into the seal recesses formed in the outer surface of the skirt plates to thereby form the gate-like clearance as the reversely bent inverted flow-passage between the anti-outflow members and the seal recesses. Since the gate-like clearance has a labyrinth effect with respect to the leakage of the outflowing material, the material that flows out of the clearance between the free end of the skirt plate and the belt carrier surface is prevented from being leaked from the gate-like clearance to both ends of the belt and it is not necessary to employ the cumbersome operation for adjusting the height of the seal recess to minimize the clearance with respect to the anti-outflow members.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A belt conveyor elevator system for lifting free-flowing particulate materials, comprising: a closed casing having a substantially square cross-section, an endless conveyor belt for lifting the free-flowing particulate material, a plurality of carrier plates projecting outwardly on the carrier surface of said conveyor belt, means for supplying free-flowing particulate material to said conveyor belt, means for discharging free-flowing particulate material from said conveyor belt, a pair of opposed skirt plates provided in spaced-apart relation on the inner surface of a wall of said casing to form a carrier passage for said carrier plates, said conveyor belt having an upright lifting section and a bent portion at the lower end thereof, a flow-down discharge plate below said bent portion for discharging said materials outwardly of said conveyor belt over both side edges of the return-side portion of said conveyor belt and a recovery guide plate for guiding scattering materials from said discharge plate into said carrier plate passage.

* * * * *